(12) United States Patent
Sato et al.

(10) Patent No.: US 7,624,916 B2
(45) Date of Patent: Dec. 1, 2009

(54) REMOTE ACCESS SYSTEM AND METHOD

(75) Inventors: Ryoichi Sato, Oxford (GB); Staffan J. Corley, Oxford (GB); Philip G. Edmonds, Oxford (GB); David Robinson, Northants (GB); Anthony Hull, Oxford (GB); Victor Poznanski, Sandford-on-Thames (GB); Kozob Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 438 days.

(21) Appl. No.: 10/995,621

(22) Filed: Nov. 23, 2004

(65) Prior Publication Data
US 2005/0199699 A1 Sep. 15, 2005

(30) Foreign Application Priority Data
Nov. 27, 2003 (GB) ................................ 0327544.3

(51) Int. Cl.
G06F 17/00 (2006.01)
G06K 5/00 (2006.01)
G06K 7/10 (2006.01)
G06K 19/00 (2006.01)
G06K 19/06 (2006.01)

(52) U.S. Cl. .................. 235/375; 235/382; 235/462.01; 235/487; 235/494

(58) Field of Classification Search ......... 235/378–380, 235/385, 375, 382, 462.01, 487, 494; 340/572.1, 340/572.3; 709/218, 219; 705/22, 20, 25, 705/64
See application file for complete search history.

(56) References Cited

U.S. PATENT DOCUMENTS 4,288,659 A * 9/1981 Atalla ........................ 380/281

5,118,369 A 6/1992 Shamir (Continued)

FOREIGN PATENT DOCUMENTS

EP 1 058 196 A2 12/2000

(Continued)

OTHER PUBLICATIONS

Chinese Office Action for corresponding Application No. 200410082242.6 dated Sep. 8, 2006.

*Primary Examiner*—Daniel Walsh
(74) *Attorney, Agent, or Firm*—Renner, Otto, Boisselle & Sklar, LLP

(57) ABSTRACT

A method and apparatus is disclosed of employing an information device (20) to transfer one or more data items from a remote holding area (32) to a local device (46) in dependence upon an access identifier representing the location of the one or more data items. The method comprises the steps of presenting an audio/visual representation of the access identifier at the information device (20), capturing the audio/visual representation at the local device (46), determining the location of the one or more data items from the captured audio/visual representation, and transferring the one or more data items to the local device (46) from the determined location. In a preferred embodiment, the information device (20) is a mobile device such as a mobile telephone, the audio/visual representation comprises a graphical representation such as a bar code that is displayed on a display (25) of the information device (20), and the bar code representation is captured at the local device (46) using a bar code scanner (49).

68 Claims, 6 Drawing Sheets

U.S. PATENT DOCUMENTS

| | | | |
|---|---|---|---|
| 5,369,261 A | 11/1994 | Shamir | |
| 5,740,252 A * | 4/1998 | Minor et al. | 713/153 |
| 5,979,762 A * | 11/1999 | Bianco | 235/462.01 |
| 6,144,997 A * | 11/2000 | Lamming et al. | 709/217 |
| 6,397,621 B1 | 6/2002 | Reynaud et al. | |
| 6,430,601 B1 | 8/2002 | Eldridge et al. | |
| 6,431,772 B1 * | 8/2002 | Melo et al. | 400/70 |
| 6,487,189 B1 | 11/2002 | Eldridge et al. | |
| 6,661,883 B1 * | 12/2003 | Dowser et al. | 379/156 |
| 6,690,481 B1 * | 2/2004 | Yeung et al. | 358/1.15 |
| 6,748,057 B2 * | 6/2004 | Ranalli et al. | 379/88.17 |
| 7,066,382 B2 * | 6/2006 | Kaplan | 235/375 |
| 2001/0051915 A1 * | 12/2001 | Ueno et al. | 705/39 |
| 2002/0004404 A1 | 1/2002 | Squibbs | |
| 2002/0023213 A1 * | 2/2002 | Walker et al. | 713/168 |
| 2002/0023228 A1 * | 2/2002 | Schlesinger et al. | 713/201 |
| 2002/0060246 A1 * | 5/2002 | Gobburu et al. | 235/462.46 |
| 2002/0099809 A1 * | 7/2002 | Lee | 709/223 |
| 2002/0131071 A1 | 9/2002 | Parry | |
| 2003/0005282 A1 * | 1/2003 | Bade | 713/151 |
| 2003/0028646 A1 * | 2/2003 | Wray | 709/227 |
| 2003/0030840 A1 * | 2/2003 | Parry | 358/1.15 |
| 2003/0115152 A1 | 6/2003 | Flaherty | |
| 2003/0173405 A1 * | 9/2003 | Wilz et al. | 235/462.01 |
| 2004/0026502 A1 * | 2/2004 | Tame | 235/382 |
| 2004/0196491 A1 * | 10/2004 | Uchino | 358/1.15 |
| 2004/0215775 A1 * | 10/2004 | Murray et al. | 709/225 |
| 2005/0055560 A1 * | 3/2005 | Kendon | 713/189 |
| 2005/0198291 A1 * | 9/2005 | Hull et al. | 709/225 |
| 2008/0290161 A1 * | 11/2008 | Blake | 235/382 |

FOREIGN PATENT DOCUMENTS

| | | |
|---|---|---|
| EP | 1 065 605 A2 | 1/2001 |
| JP | 2003-244285 | 8/2003 |
| WO | 00/03328 | 1/2000 |
| WO | 02/19198 | 3/2002 |

* cited by examiner

REMOTE ACCESS SYSTEM AND METHOD

BACKGROUND OF THE INVENTION

1. Field of the Invention

The present invention relates to a remote access system and method, and particularly to a remote access system and method for transferring data items between a remote server or holding area and a local device.

2. Description of the Related Art

It is increasingly common for workers to require access to corporate documents and email even when away from the office, and a variety of products and systems have been developed to suit the needs of such mobile workers. Most popular are Virtual Private Networks (VPNs) and VPN solutions are now available for both computers, for example desktop and laptop Penal Computers (PCs and mobile devices, for example Personal Digital Assistants (PDAs) and mobile phones.

However, while a VPN allows interaction with private corporate information on a device's screen, it does not always give convenient access to the surrounding peripherals. For example, a mobile worker cannot use an available (public) printer unless they physically attach it to their mobile device and install drivers. Similarly, scanners, monitors, projectors and other peripherals cannot be used in an ad hoc and wireless way so as to interact securely with private corporate information. This is particularly so for mobile workers for whom it is not practical to carry a laptop since, although mobile devices are being developed to support VPNs, these devices lack rendering capabilities, drivers and the physical connectivity to allow connection to local peripherals.

Likewise, Microsoft and IBM's Lotus division both produce products that allow a user to browse their email on a mobile phone, but there is no way for the user to print out an email on a local printer, or to display the email on an available large screen in order to read it comfortably. This is particularly a problem when emails contain attachments (word processor documents, presentations, spreadsheets, graphics) that cannot be satisfactorily viewed on the small screen of a typical mobile device.

Peripherals such as those mentioned are becoming publicly available. For example, convenience stores such as Lawson's and Seven-Eleven in Japan already have printers behind the counter, currently used mainly for photo printing.

Our co-pending United Kingdom application no. 0309045.3 describes a system allowing a corporate server to stream a rendered document through a mobile device to a local printer. However, this system requires much, if not all, of the rendered document to be transferred over potentially costly and slow mobile networks. It also requires the mobile device to have capabilities that are not yet standard.

FIG. 1 of the accompanying drawings is a block diagram illustrating a remote access system disclosed in U.S. Pat. No. 6,144,997 ("System and method for accessing and distributing electronic documents"), U.S. Pat. No. 6,397,621 ("Secure token-based document server"), U.S. Pat. No. 6,430,601 ("Mobile Document Paging Service") and U.S. Pat. No. 6,487,189 ("Mobile E-mail Document Transaction Service"). The system, referred to herein as the Satchel system, comprises a mobile device 2 in wireless communication with a document server 4 and an Internet-enabled appliance 6. The system allows the wireless mobile device 2 to store a document token, for example a URL (Uniform Resource Locator), specifying a document to be retrieved from the document server 4, and to pass on the document token wirelessly to the Internet-enabled appliance 6 in order that the appliance 6 may retrieve the document specified by the document token from the document server 4. The system allows the distribution of documents from one person to another by transmission of the document token rather than the document itself.

FIG. 2 of the accompanying drawings is a block diagram illustrating the PrintMe system (see www.printme.com for details). The system comprises a PrintMe Service 10 located within and accessible through the World Wide Web 8, a Personal Computer 16 located within a private space 12, for example a Local Area Network (LAN), protected by a barrier 14 such as a firewall, and a PrintMe Printer 18.

The PrintMe system operates as follows. A mobile user who wishes to print a document located on their Personal Computer 16 uploads that document in advance from the Personal Computer 16 to the PrintMe Service 10, usually relying on the PrintMe service to render the document before printing. The user can specify which one of a number of PrintMe printers 18 is to print the document at the time of uploading that document to the PrintMe Service 10, so that every PrintMe printer 18 requires a unique identifier. It is also possible that a code is generated by the PrintMe Service 10 associated with the document the user has uploaded; the user is then able to enter the code directly into the chosen printer in order to retrieve and print the document at that printer.

The mDoc product from Xerox® can integrate mobile document access with the PrintMe system. The mDoc product allows a document to be printed by selecting the document on a mobile device and entering the identifier of a remote printer into the mobile device in order to send the printer, and uses the PrintMe service to achieve this. The document is sent immediately to the specified printer.

US-A-2002/0004404 describes a system in which the user sends a message to a display or printer, via a mobile phone network. This message contains the URL of some content that the user wishes the appliance to display or print. The appliance then retrieves this content and renders it.

Our co-pending United Kingdom application no. 0314410.2 discloses a remote access method that enables the transfer of documents from a remote server to a (public) local device under the control of a mobile device. The method of transfer involves creating an access identifier that is either displayed on the screen of the mobile device and typed into the local device by the user, or is transferred from the mobile device to the local device by a local wireless connection (for example, infrared, Bluetooth® or wireless LAN); the local device can then use the access identifier to retrieve the documents.

All of the above methods suffer from one of the two following drawbacks. Either the user is required unnecessarily to enter information into either the local or mobile device, or the mobile device requires communication mechanisms that are not readily available on current-generation mobile phones.

In relation to the former drawback, in one embodiment described in our co-pending United Kingdom application no. 0314410.2, the access identifier is entered into the local device by hand and this may involve significant typing. In the mDoc scenario, the user is unnecessarily required to enter the identifier of the printer into the mobile device, even though they may be situated directly in front of the printer.

In relation to the latter drawback, even though some mobile phones do have local networking capabilities (infrared, Bluetooth®), on no current phone are these capabilities accessible from within the phone's web browser (which would typically be used to display the application allowing documents to be selected). On some phones it may be possible to install an application that would allow communication over a local wireless network (for example, phones based on the Symbian or Microsoft SmartPhone operating systems). However, this requires the user or phone vendor to have undertaken a previous step of modifying the phone's software. Regardless, many phones lack any sort of local networking capabilities at all.

These drawbacks mean that all the previous-considered schemes that have sought to make local peripherals available from mobile devices have either been cumbersome for the user, requiring them to perform unnecessary extra steps to initiate the document transfer, or cannot be deployed on most current generation mobile phones (without significant hardware and/or software modifications to the phone).

SUMMARY OF THE INVENTION

An embodiment of a first aspect of the present invention provides a method of employing an information device to transfer one or more data items from a remote holding area to a local device. The transferral is performed in dependence upon an access identifier representing the location of the one or more data items. An audio/visual representation of the access identifier is presented at the information device. The audio/visual representation is captured at the local device. The location of the one or more data items is determined from the captured audio/visual representation. The one or more data items are transferred to the local device from the determined location.

The audio/visual representation may comprise a graphical representation. The step of presenting the audio/visual representation at the information device may comprise displaying the graphical representation on a display of the device. The graphical representation may be visible to a human eye. The graphical representation may comprise colour.

The graphical representation may comprise a bar code representation. The graphical representation may comprise a two-dimensional bar code representation. The two-dimensional bar code representation may be the Quick Response Code representation. The two-dimensional bar code representation may be the hueCode representation. The step of capturing the audio/visual representation at the local device may comprise scanning the bar code representation with a bar code scanner.

The audio/visual representation may comprise a textual representation. The step of determining the location may comprise decoding the textual representation using an optical character recognition algorithm.

The audio/visual representation may comprise a sequence of graphical representations. The graphical representations in the sequence may be presented at predetermined intervals. The interval between consecutive graphical representations in the sequence may be varied throughout the sequence to encode further information regarding the access identifier. Each graphical representation in the sequence may be a uniform colour.

The audio/visual representation may comprise an audio sequence. The audio sequence may comprise a sequence of tones, chords, pulses or clicks.

At least two of the steps of capturing, determining and transferring may be performed by separate devices in communication with each other and which separate devices together form the local device.

The holding area may be located on a remote server.

The one or more data items may initially be stored in a protected area of a remote server, with the remote holding area located outside the protected area of the remote server. The method may further comprise the steps of: forming a trusted connection between the information device and the protected area of the remote server, employing the information device and the trusted connection to select a first group of one or more data items stored in the protected area of the remote server, transferring the first group of data items from the protected area to the holding area and associating the access identifier with the first group of data items; forming a retrieval connection between the local device and the holding area in dependence upon the access identifier; determining a second group of one or more data items from the first group of data items transferred to the holding area; and transferring the second group of data items from the holding area to the local device over the retrieval connection.

The access identifier may comprise a location identifier representing the location of the holding area. The location identifier itself may contain sufficient information to identify the location of the holding area. The method may further comprise the step of looking up the location of the holding area in dependence upon the location identifier.

The access identifier may comprise a group identifier identifying the one or more data items in the holding area without identifying the location of the holding server. The second group of data items may be determined in dependence upon the group identifier identifying the first group of data items transferred to the holding area. The second group of data items may be determined to be the same as the first group of data items.

The local device may use generic Internet browsing capabilities to access data items in the holding area. The method may further comprise the step of processing a data item before transferring it to the local device. The processing that is performed may be dependent upon the type of the local device. The processing that is performed may be dependent upon the location of the local device.

The method may further comprise the steps of encrypting a data item before it leaves the holding area, and decrypting the data item after receipt at the local device. The access identifier may comprise decryption information necessary to perform decryption of the data item. The encryption and decryption may use a symmetric key cryptography algorithm.

The method may further comprise the step of the revoking the access identifier after a predetermined number of uses. The predetermined number may be one. The method may further comprise the step of generating a new access identifier following revocation of the previous one. The method may further comprise the step of revoking the access identifier after a predetermined length of time. The method may further comprise the step of revoking the access identifier after all the data items associated with the access identifier have been retrieved from the holding area. The method may further comprise the step of deleting a data item from the holding area after it has been retrieved a predetermined number of times. The predetermined number of times may be one. One or more data items associated with the access identifier may be deleted if the access identifier is revoked.

The local device may comprise an output device. The local device may comprise a printer, and the method may further comprise the step of printing part or all of at least one of the data items transferred to the local device on the printer. The local device may comprise a display, and the method may further comprise the step of displaying part or all of at least one of the data items transferred to the local device on the display.

At least one of said data items may be an email item. At least one of said data items may be a document. The method may comprise the step of printing an email item or a document, as the case may be, on the printer.

The information device may be a mobile information device. The information device may be a Personal Digital Assistant. The information device may be a mobile phone. The method may further comprise the step of authenticating the information device by requesting the Subscriber Identity Module number or other operator identifier from the information device. The information device may be a laptop computer. The information device may also be a Digital Television or a Personal Computer. The local device may also be a further information device of any one of such types mentioned above.

The local device may be a public appliance accessible by the general public. The access identifier may comprise a Uniform Resource Locator.

The information device may be in proximity to the local device, and this may be a requirement before access is granted to the services of the local device.

The method may further comprise the step of transferring one or more data items received at the local device to a separate device, which may be the information device itself. The local device may be used an access point for high-speed retrieval of data items to the separate device.

The method may further comprise the step of authenticating the information device before transferring the one or more data items. The access identifier may comprise authentication information necessary to perform authentication of the information device.

An embodiment of a second aspect of the present invention provides a remote retrieval system. The remote retrieval system comprises a remote holding area for storing data items, a local device in communication with the remote holding area, and an information device comprising an audio/visual presentation portion. An audio/visual representation of an access identifier, representing the location of one or more data items to be transferred from the remote holding area to the local device, is presented at the audio/visual presentation portion. The local device comprises an audio/visual capturing portion, which captures the audio/visual representation presented at the information device. The local device also comprises a location determining portion which determines the location of the one or more data items from the captured audio/visual representation. The local device also comprises a transferral portion which transfers the one or more data items to the local device from the determined location.

An embodiment of a third aspect of the present invention provides a local device for use in a remote retrieval system. The remote retrieval system comprises a remote holding area for storing data items in communication with the local device and an information device comprising an audio/visual presentation portion which presents an audio/visual representation of an access identifier representing the location of one or more data items to be transferred from the remote holding area to the local device. The local device comprises an audio/visual capturing portion which captures the audio/visual representation presented at the information device. The local device also comprises a location determining portion which determines the location of the one or more data items from the captured audio/visual representation. The local device also comprises a transferral portion which transfers the one or more data items to the local device from the determined location.

An embodiment of a fourth aspect of the present invention provides a method of employing an information device to transfer one or more data items from a local device to a remote holding area. The transferral is performed in dependence upon an access identifier representing the destination location of the one or more data items. An audio/visual representation of the access identifier is presented at the information device. The audio/visual representation is captured at the local device. The destination location of the one or more data items is determined from the captured audio/visual representation. The one or more data items are transferred to the determined location in the remote holding area. The local device may comprise an input device, which may be a scanner and/or a photocopier.

An embodiment of a fifth aspect of the present invention provides a remote transferral system. A remote holding area stores data items. A local device is in communication with the remote holding area. An information device comprises an audio/visual presentation portion which presents an audio/visual representation of an access identifier representing the destination location of one or more data items to be transferred from the local device to the remote holding area. The local device comprises an audio/visual capturing portion which captures the audio/visual representation presented at the information device. The local device also comprises a location determining portion which determines the destination location of the one or more data items from the captured audio/visual representation. The local device also comprises a transferral portion which transfers the one or more data items to the determined location of remote holding area.

An embodiment of a sixth aspect of the present invention provides a local device for use in a remote transferral system. The remote transferral system comprises a remote holding area storing data items. The local device is in communication with the remote holding area. The remote transferral system also comprises an information device comprising an audio/visual presentation portion which presents an audio/visual representation of an access identifier representing the destination location of one or more data items to be transferred from the local device to the remote holding area. The local device comprises an audio/visual capturing portion which captures the audio/visual representation presented at the information device. The local device also comprises a location determining portion which determines the destination location of the one or more data items from the captured audio/visual representation. The local device also comprises a transferral portion which transfers the one or more data items to the determined location of remote holding area.

An embodiment of a seventh aspect of the present invention provides an operating program which, when loaded into a local device, causes the device to become one according to an embodiment of the third or sixth aspects of the present invention. The operating program may be carried on a carrier medium. The carrier medium may be a transmission medium or a storage medium.

DETAILED DESCRIPTION OF THE PREFERRED EMBODIMENTS

Figure 1:
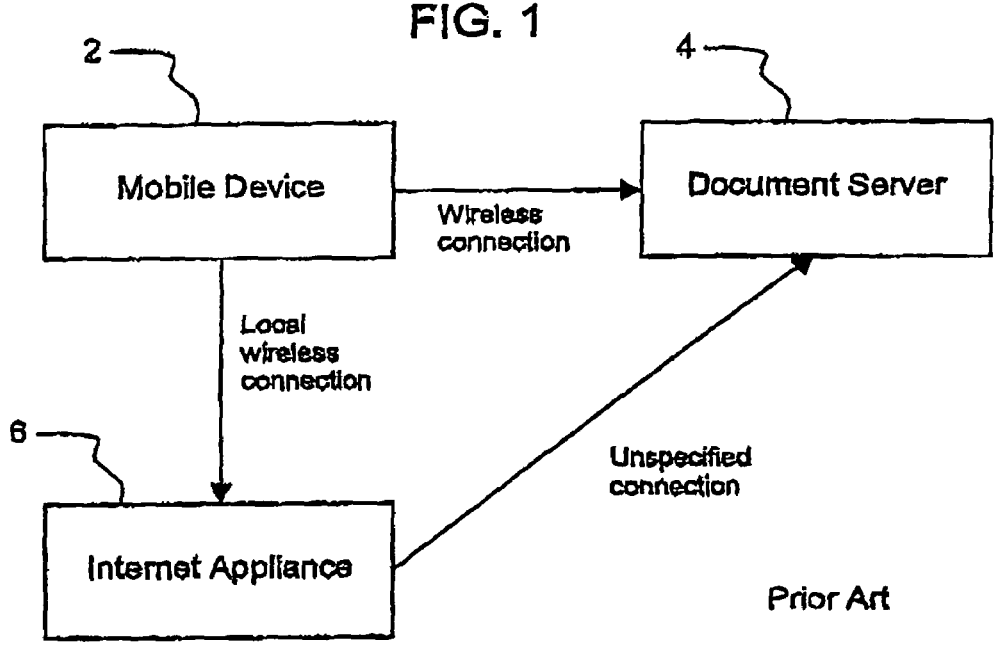
FIG. 1, discussed hereinbefore, is a block diagram illustrating a prior art remote access system.
Figure 2:
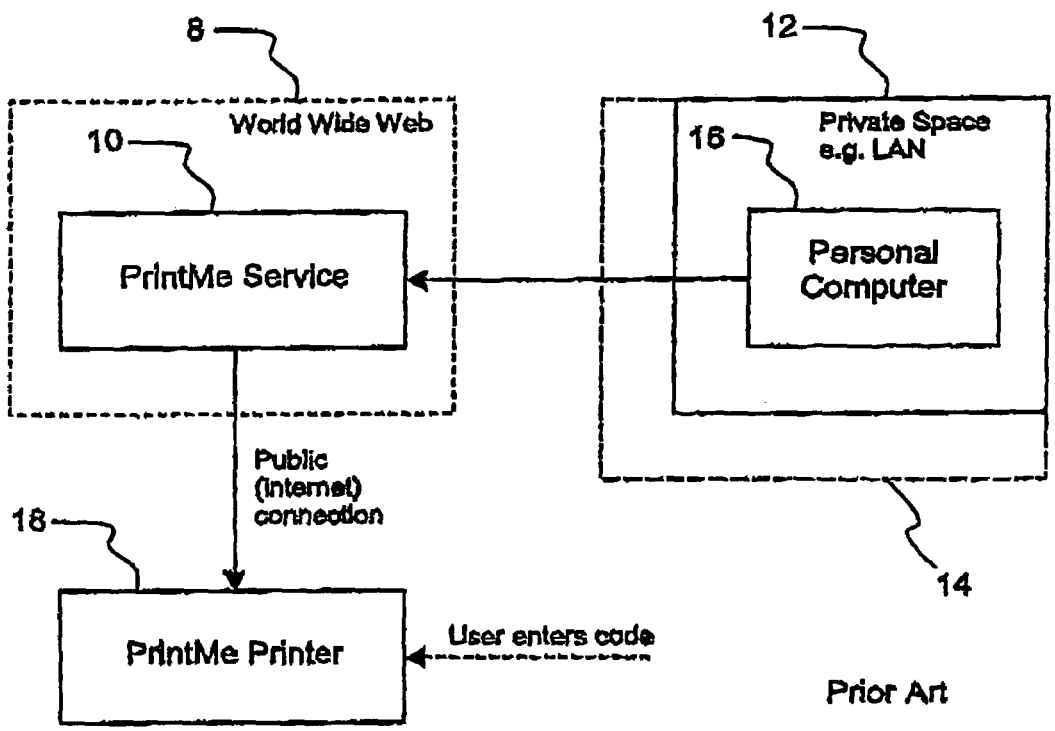
FIG. 2, also discussed hereinbefore, is a block diagram illustrating another prior art remote access system.
Figure 3:
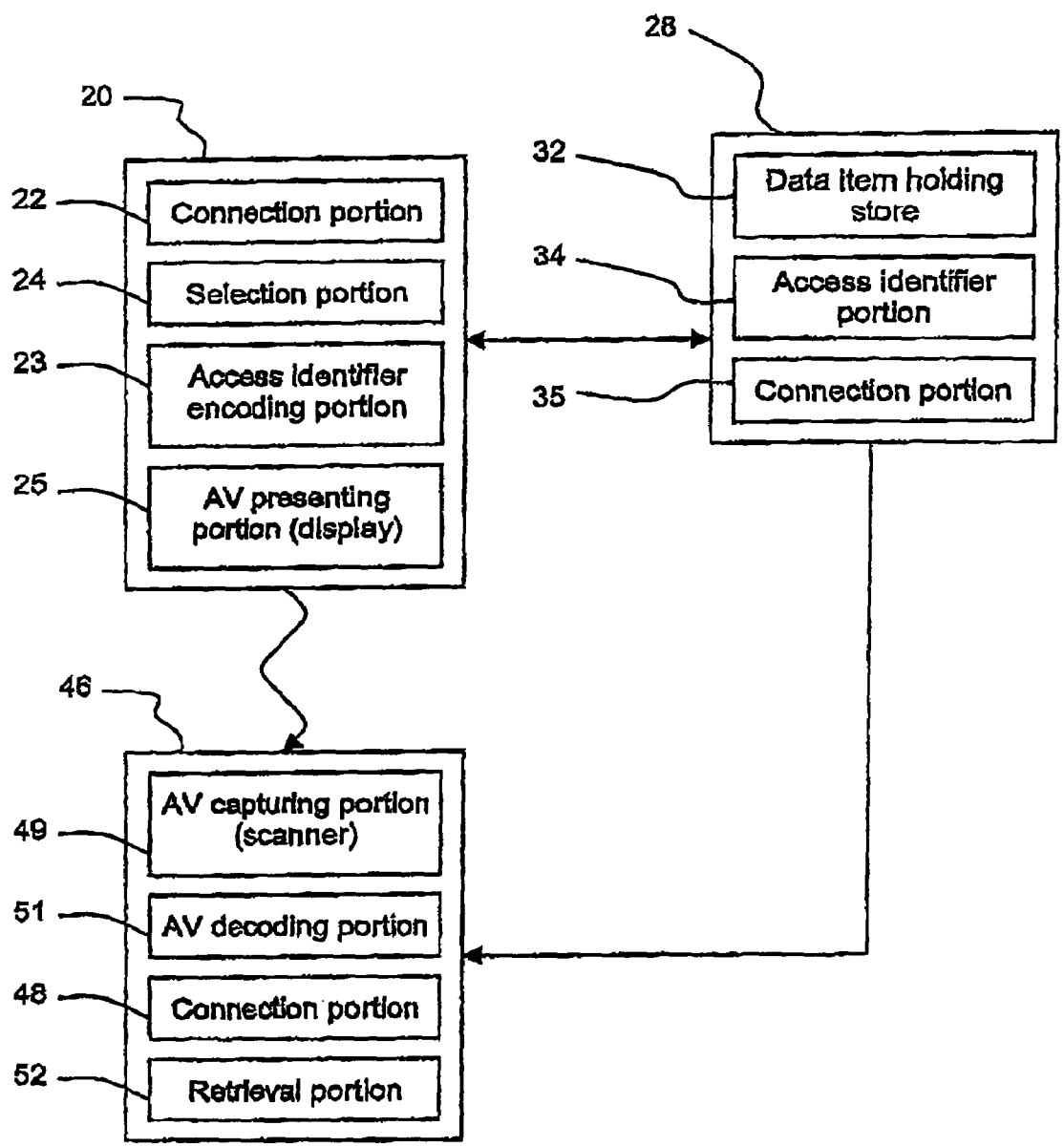
FIG. 3 is a block diagram illustrating a remote retrieval system according to a first embodiment of the present invention.

FIG. 3 is a block diagram illustrating a remote retrieval system according to a first embodiment of the present invention. The remote retrieval system comprises an information device 20, a remote server 28 and a local device 46. The information device 20 comprises a connection portion 22, a selection portion 24, an access identifier encoding portion 23 and an audio/visual (AV) presenting portion 25. In this embodiment the AV presenting portion 25 is a display 25. The remote server 28 comprises a data item holding store 32, an access identifier portion 34 and a connection portion 35. The local device 46 comprises a connection portion 48, a retrieval portion 52, an AV capturing portion 49 and an AV decoding portion 51. In this embodiment the AV capturing portion 49 is a scanner 49.

A method of retrieving one or more data items stored in the data item holding store 32 of the remote server 28, for transferral to the local device 46, will now be described with reference to the flowchart shown in FIG. 4.

The connection portion 22 of the information device 20 attempts to initiate a connection to the remote server 28 by sending a connection request. The connection portion 35 of the remote server receives the connection request and a connection is subsequently formed between the information device 20 and the remote server 28 (step S1). The user of the information device 20 then employs the information device 20 and the connection to select one or more data items stored in the data item holding store 32 of the remote server 28 (step S2). This selection process in this embodiment is controlled by the selection portion 24 of the information device 20.

The location of the remote server 28 is represented by a location identifier and the first group of data items selected in step S2 is identified by a group identifier. In this embodiment, a single access identifier comprising the location and group identifiers is issued by the access identifier portion 34 of the remote server 28 and communicated to the information device 20 (step S3). The access identifier enables the data items to be retrieved from the data item holding store 32 of remote server 28 by the local device 46.

The access identifier that is communicated to the information device 20 is then encoded by the access identifier encoding portion 23 to an audio/visual (AV) representation, which in this embodiment is in the form of a 2D bar code representation (step S4). The 2D bar code representation is then presented (displayed) on the display 25 of the information device 20 (step S5). The information device 20 is then held up to the local device 46 such that the bar code representation is visible by the scanner 49 of the local device 46, and the bar code representation is scanned by the scanner 49 (step S6). The bar code representation is decoded by the AV decoding portion 51 (step S7) to reproduce the access identifier in a form which can be used to access the data items selected in step S2.

A retrieval connection is formed by the connection portion 48 of the local device 46 between the remote server 28 and the local device 46 (step S8) and the data items represented by the access identifier are transferred from the remote server 28 to the local device 46 over the retrieval connection (step S9) under the control of the retrieval portion 52 of the local device 46.

In the embodiment described above, the access identifier is encoded into an audio/visual representation at the information device 20. It will be appreciated that the encoding can take place before the access identifier reaches the information device 20, for example at the remote server 28; in this case the information device 20 would merely present the audio/visual representation for capture by the local device 46.

The use of a bar code representation to transfer the access identifier from the information device 20 to the local device 46 is particularly advantageous and greatly simplifies the task of retrieving a data item from a remote holing area such as the data item holding store 32 of the remote server 28. Furthermore, a method using a bar code can be used with many existing types of information device since all that is required is a screen, especially where the encoding takes place away from the information device. For example, where the information device 20 is a mobile phone, use can be made for this purpose of the existing Multimedia Message Service (MMS) protocol to send an image of the bar code.

In this specification, the term "audio/visual" is intended to define a representation that is either audio or visual, or some combination of the two, rather than being limited to a representation that is both audio and visual. In preferred embodiments of the present invention, a "visual" representation is one that is visible to a human eye. The visual representation may be in the form of an image or graphical representation, the most preferable visual representation being a two-dimensional bar code since two-dimensional bar codes can encode sufficient information for an access identifier. However, a one-dimensional bar code may also be used where appropriate. A "visual" representation can also be considered to be one that is displayable, for example, on the screen of a mobile phone or other information device. However, it will be appreciated that where an image or graphical representation is used as the visual representation, the image or graphical representation can be formed by use of light having wavelengths outside the visible range, for example, in the infrared range of wavelengths.

The display 25 on the information device 20 that displays the visual representation may be an emissive, reflective or transmissive display device. Such display devices, such as liquid crystal display (LCD) devices, are well known in the art. For example, for a reflective display device the display would have light reflective properties that could be controlled so as to form the required visual representation, and the light reflected may be in the visible range or outside the visible range. Of course, the AV capturing portion 49 would be suitably configured to respond to the appropriate range of wavelengths.

Many possible visual representations are conceivable, including but not limited to the following three examples.

Firstly, a bar code can be used as mentioned above. Two-dimensional bar codes such as the QR Code (Quick Response Code, developed in Japan by the Nippondenso Company; see ISO (International Organisation for Standardization) standard number 18004) allow particularly high information density and so would be particularly suitable for use with an embodiment of the present invention, but there are many other types of bar code. Bar codes could also use colours in order to pack more information into a smaller space (examples include the two-dimensional hueCode, for which see U.S. Pat. No. 5,369,261 and U.S. Pat. No. 5,118,369).

Secondly, a sequence of visual displays can be used, where the visual display is updated at a predefined or variable speed. In the latter case, changes in the speed of update could also be used to encode further information. For example, the information device could display a sequence of (possibly colour and/or 2D) bar codes, or the device could display a sequence of (possibly full-screen) colours. In case where the device displays a sequence of colours, the sequence could be captured and decoded by a set of photodiodes rather than a camera or bar code scanner, leading to a simpler and more cost-effective implementation.

Finally, a textual representation of the identifier could be displayed at the information device 20, which could be captured by a camera and decoded using optical character recognition (OCR) software. A camera could be used to capture any form of graphical representation for subsequent decoding, whether a bar code or not.

The AV capturing portion 49 may be a scanner as described above or may any other type of light sensor such as a photodiode, a CCD or CMOS camera. A set of photodiodes could be used. For example, three photodiodes could be used to respond to the primary colours. The screen of the information device 20 could then be filled with a sequence of different mixtures of primary colours, representing different values. In respect of a scanner, the information device 20 could be held in front of a standard or 2D bar code scanner, or the information device 20 could be placed on top of a flatbed scanner.

A suitable "audio" representation need not be audible by a human ear so that, for example, ultrasound may be used. The access identifier may be encoded as an audio sequence, for example a sequence of tones, chords, pulses or clicks. In this case, the AV capturing portion 49 would comprise an audio sensor such as a microphone.

Several previous disclosures relate to the use of two-dimensional bar codes on a mobile device. WO 00/03328 discloses a system in which a bar code is used to encode demographic information (and optionally a money-off coupon), which may be scanned at a supermarket check-out. US 2003/0115152 also discloses the display of money-off coupons in bar code form on a mobile device. US 2002/0060246 relates to browsing categorised information and purchasing something (for example, an airline ticket) which may be encoded as a bar code on a mobile phone. US application 2001/0051915 describes a system where, in one embodiment, a bar code identifying the user is displayed on a mobile device and scanned at a point-of-sale in order to authorise payment for some good or service. WO 02/19198 concerns sending certificates to mobile phones as bar codes. In US 2002/0131071 and US 2003/0030840 a URL (and possibly a PIN number) is sent to a printer, encoded as a bar code. The printer decodes the bar code, retrieves a document from the URL and prints it. EP-A-1058196 discloses a bar code reader attached to a hand-held device for reading in and displaying a URL (Uniform Resource Locator); EP-A-1065605 is similar but does not have a mobile device. None of this prior art relates to displaying a bar code on an information device, scanning this bar code into a local device, and retrieving one or more data items from a remote server to the local device in dependence upon an access identifier encoded by the bar code.

The local device 46 may comprise a printer, computer, monitor, projector or download point, or any other type of output device. In each case, the audio/visual representation is decoded and passed to a retrieval service, which uses the identifier to retrieve one or more documents (data items) and perform some service on them. Where the local device 46 comprises a printer, the service could be printing the documents. Where the local device 46 comprises a monitor or projector, the service could be displaying the documents. Where the local device 46 comprises a download point, the service could be transferring the documents to the information device. In any case, the service could include displaying a list of the names of the documents.

Figure 5:
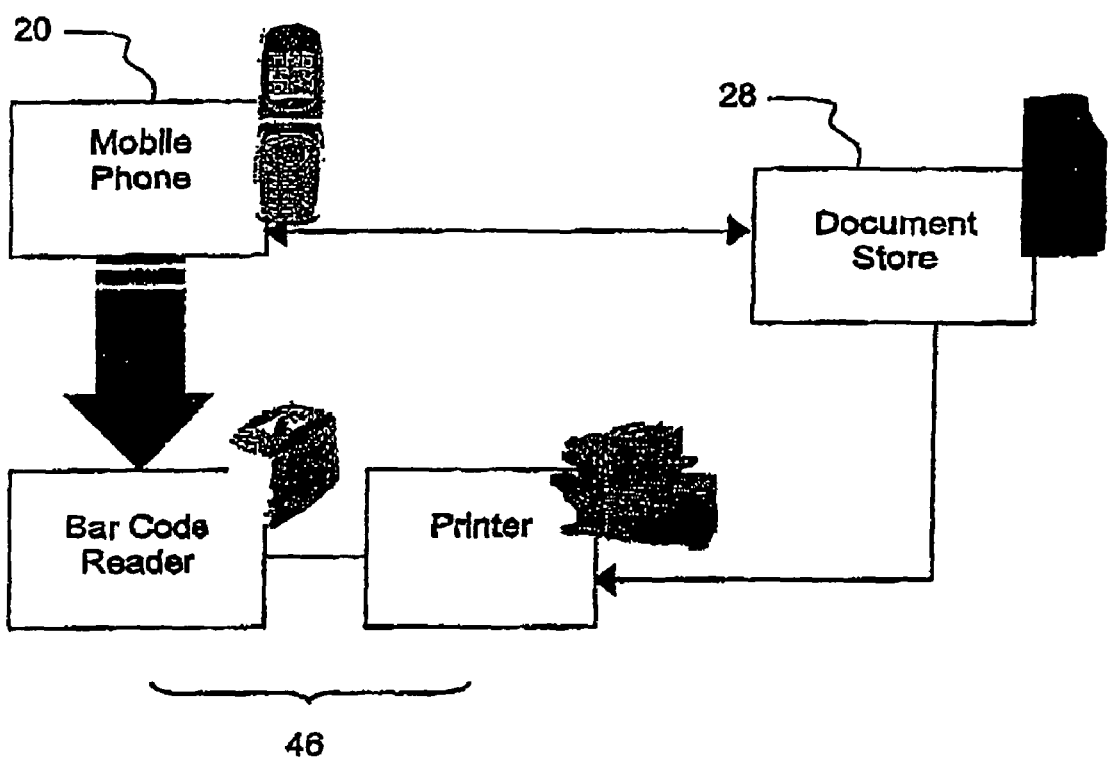
FIG. 5 is a schematic diagram representing one possible implementation of the first embodiment of the present invention.

Although the local device 46 is described above as though it were a single entity in which the connection portion 48, retrieval portion 52, AV capturing portion 49 and AV decoding portion 51 are located, it is possible that the local device 46 in fact comprises separate devices which are connected together (by physical connection or by wireless link) to form the local device 46. For example, the AV capturing portion 49, optionally with the AV decoding portion 51, may form part of an integral scanner device that is connected to a printer to form the local device 46. This possibility is illustrated schematically in FIG. 5, and corresponds to the FIG. 3 system in which the access identifier is represented as a 2D bar code, the information device 20 is embodied as a mobile phone and the scanner device is embodied a bar code reader.

The access identifier may relate to several data items, but may also be a document token like that described in the Satchel system above that relate only to a single data item.

Figure 6:
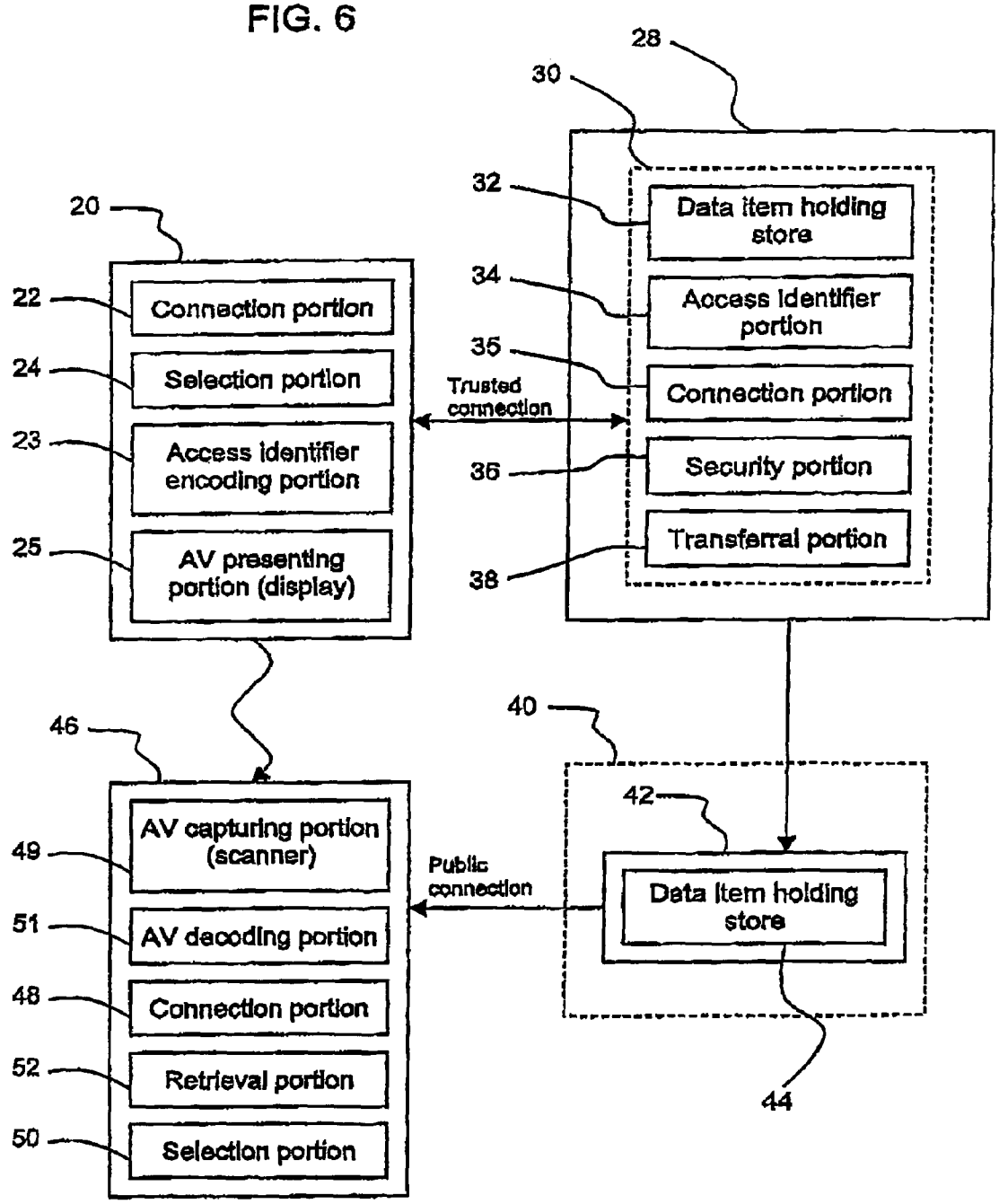
FIG. 6 is a block diagram illustrating a remote retrieval system according to a second embodiment of the present invention.

FIG. 6 is a block diagram illustrating a remote retrieval system according to a second embodiment of the present invention. The remote retrieval system of the second embodiment is based on the first embodiment described above, with parts of the second embodiment operating in the same or a corresponding way as like-numbered parts of the first embodiment. The main differences between the first and second embodiments will be described here. The second embodiment is also closely related to the main embodiment described in our co-pending United Kingdom application no. 0314410.2, the entire contents of which are herein incorporated by reference as basis for one or more of the appended claims.

The remote retrieval system according to the second embodiment of the present invention comprises the following parts in addition to those parts described above in respect of the first embodiment. In addition to the information device 20, remote server 28 and local device 46 described above, the remote retrieval system of this embodiment comprises a holding server 40. The holding server 40 comprises a holding area 42 having a data item holding store 44. The remote server 28 comprises a protected area 30 in which the data item holding store 32, access identifier portion 34 and connection portion 35 described above are located. In addition, the remote server 28 further comprises a security portion 36 and a transferral portion 38. The local device 46 further comprises a selection portion 50.

In this embodiment, when the connection portion 22 of the information device 20 attempts to initiate a connection to the remote server 28, the security portion 36 of the remote server 28 first verifies the authenticity and trustworthiness of the information device 20, and if satisfied then a trusted connection is formed between the information device 20 and the protected area 30 of the remote server 28. Similarly to the first embodiment, the user of the information device 20 then employs the information device 20 and the trusted connection to select a first group of one or more data items stored in the data item holding store 32 of the protected area 30 of the remote server 28. This selection process is controlled by the selection portion 24 of the information device 20.

The user of the information device 20 then sends a request to the remote server 28 to transfer the first group of data items from the protected area 30 to the data item holding store 44 within the holding area 42 outside the protected area 30 of the remote server 28. This request is processed by the transferral portion 38 of the remote server 28. The location of the holding area 42 is represented by a location identifier and the first group of data items transferred to the holding area 42 is identified by a group identifier. A single access identifier comprising the location and group identifiers is issued by the access identifier portion 34 of the remote server 28 and communicated to the information device 20. The access identifier enables the data items to be retrieved from the holding area 42 by the local device. The access identifier is then encoded as an audio/visual representation and transmitted to the local device 46 in the manner described above in connection with the first embodiment.

A retrieval connection is formed by the connection portion 48 of the local device 46 between the holding area 42 and the local device 46 and a second group of one or more data items can be selected from the first group of data items being held in the holding area. This is achieved by presenting to the user at the local device a list of available documents, which the user can select, and this is controlled by the selection portion 50 of the local device 46. Having determined the second group of data items, those data items are transferred from the holding area 42 to the local device 46 over the retrieval connection under the control of the retrieval portion 52 of the local device 46.

This embodiment of the present invention allows the information device 20 (e.g. a mobile device) to arrange for the local device 46 (e.g. a local peripheral) to have limited and temporary access to the data items (e.g. corporate documents and emails) over the retrieval connection (e.g. the Internet), without compromising security arrangements for the protected area 30 of the remote server 28 (e.g. a corporate Local Area Network (LAN)). The local peripheral can act as a secure, temporary extension to the user's office, without the cost and speed penalties of transferring the document over the mobile networks. An embodiment of the present invention will work on current generation mobile devices. The local device may be a printer, allowing the mobile worker to print corporate documents and email whilst on the move.

The second embodiment of the present invention allows the user of a mobile device (information device) to output, to a public device (local device), documents that are stored securely on a protected network. The user has a secure connection into a private and protected space such as a corporate LAN. This private space is protected from intrusion by some mechanism. The mechanism may be a firewall, in which case access is normally achieved via a Virtual Private Network, but may also be a password-protected area in a data centre. The holding area 42 may be on a public space such as a web server to which any Internet appliance can connect and, given appropriate authentication, retrieve information from. In the above embodiment, information is pushed from the protected area 30 out to the holding area 42, but there is no access from the holding area 42 into the protected area 30. This greatly enhances the security of the protected area 30.

Further variations and modifications of the second embodiment will be readily apparent to the skilled person from a review of our co-pending United Kingdom application no. 0314410.2.

Figure 7:
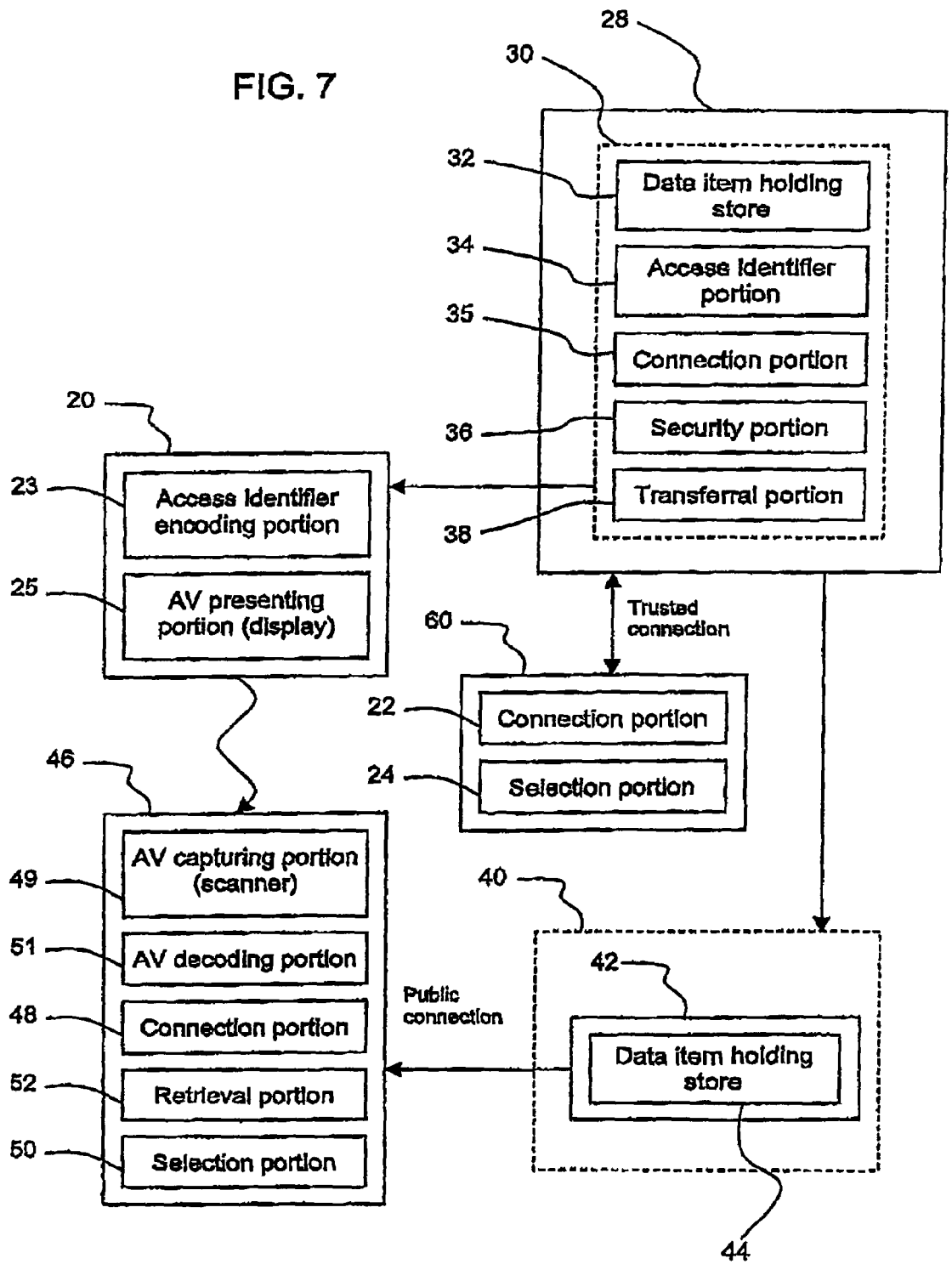
FIG. 7 is a block diagram illustrating a remote retrieval system according to a third embodiment of the present invention.

FIG. 7 is a block diagram illustrating a remote retrieval system according to a third embodiment of the present invention. The third embodiment is very similar to the second embodiment and a detailed description thereof will not be given. The main difference between the second and third embodiments is that the connection portion 22 and the selection portion 24 are located in a second information device 60 that is separate from the (first) information device 20. Thus the trusted connection is set up between the second information device 60 and the remote server 28, and data items stored in the data item holding store 32 are selected from the further information device 60. Subsequently, the steps taken are the same as for the second embodiment, so that the access identifier is sent to the first information device 20 for presentation to the local device 46.

With the third embodiment, the user who selects the data items with the second information device may be a different person to the user of the first information mobile device; for example, person A (in the office) selects some documents for person B (out of the office) to print out, and a Multimedia Message Service (MMS) message is sent to person B's mobile phone containing an access identifier for the documents.

A useful feature of any of the first to third embodiments is that a user may scan the audio/visual bar code representation at the local device 46 (e.g. a printer) some time after the data items (e.g. documents) are actually selected. The user may therefore select the documents while on the train or in their home office, and then print them later when on the move. Referring to the first embodiment and to FIG. 4 in particular, this means that the step S5 and/or the step S6 may be somewhat separated in time from the step S4.

Figure 4:
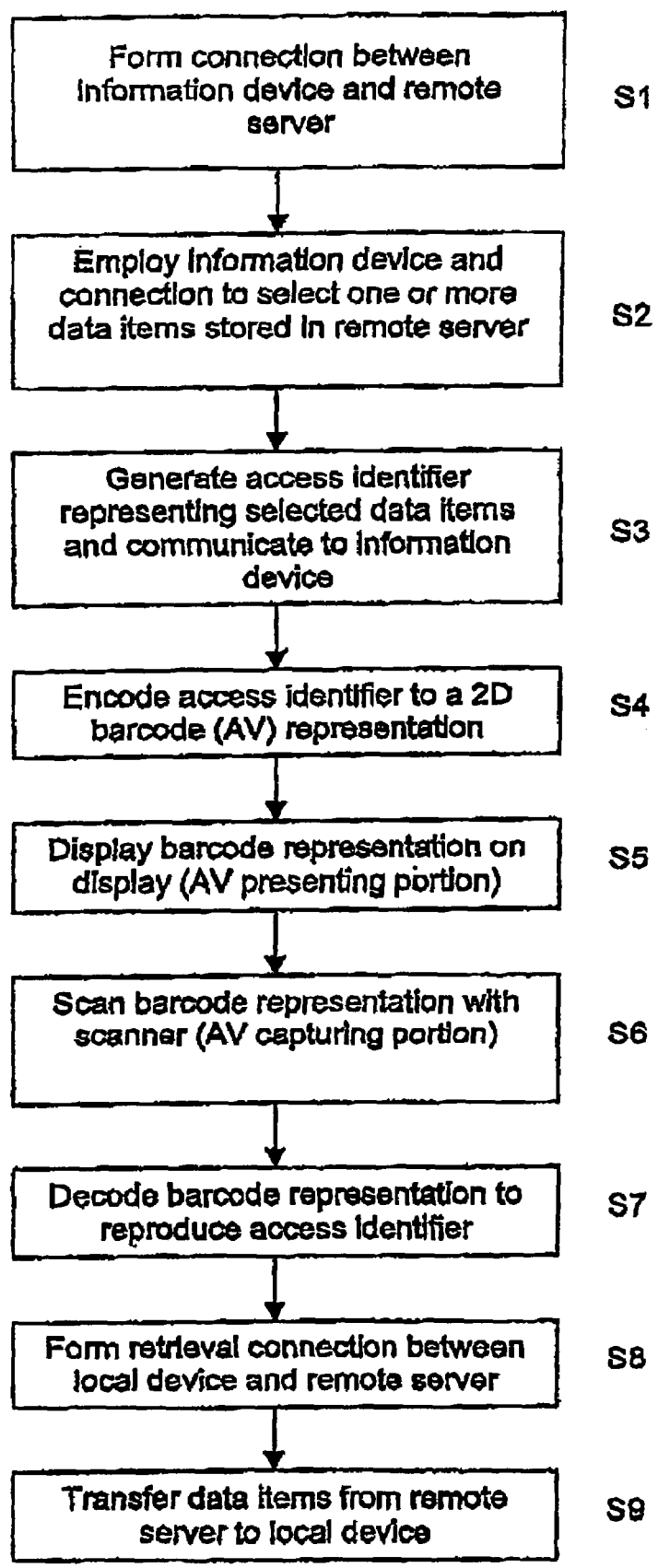
FIG. 4 is a flowchart for use in explaining the operation of the remote retrieval system of FIG. 3.

Further, the generation and encoding of the access identifier (steps S3 and S4) could also take place some time after the document selection (step S2 of FIG. 4). One example of this is where the user selects the documents at one time, and then disconnects from the remote server. At a later time the user (or a different user) connects to the server and requests a bar code for the previously selected documents, and the bar code is then sent to the requesting user for use whenever is convenient.

Various permutations of the features of the first to third embodiments will be apparent to the skilled person. For example, the second information device 60 of the third embodiment need not be used in combination with the holding server 40 introduced in the second embodiment but may be used without such a security mechanism as in the first embodiment. Also, in the third embodiment the first information device 20 may be provided with the secure connection and data item selection capabilities of the second embodiment as well as, rather than instead of, the second information device 60. The first embodiment may include the data item selection capabilities at the local device 46 as for the second and third embodiments. Various other working permutations would be readily apparent.

The information device 20 may be any suitable device, such as a Personal Digital Assistant (PDA), a laptop, a desktop computer in another company or a web-enabled TV. The local device can be any public or Internet appliance such as an Internet-enabled photocopier, stand-alone monitor or a computer in an Internet café. The local device may be in an office (e.g. a photocopier, or someone else's computer), or may be someone else's private device (e.g. a computer, another mobile device, an Internet-enabled TV, a home server or a gateway).

The first embodiment described above can be modified in a straightforward manner to allow a data item to be transferred in the reverse direction, from the local device 46 to the remote server 28. This would be particularly appropriate where the local device 46 comprises an input device such as a scanner or photocopier that produces electronic data items. In this reverse situation, the information device 20 is employed to transfer one or more data items from the local device 46 to the data item holding store 32 of the remote server 28, and the access identifier in this context would represent the destination location of the one or more data items. As in the first embodiment, an audio/visual representation of the access identifier would be presented at the information device 20, the audio/visual representation would be captured at the local device 46, and the destination location of the one or more data items would be determined from the captured audio/visual representation. The one or more data items would then be transferred to the determined location in the remote server 28. Similar modifications of the second and third embodiments, and variations of each of the first to third embodiments, would be readily apparent to the skilled person to achieve data item transferral in the reverse direction.

Operation of various aspects of the methods described above can be controlled by an operating program on the information device, the remote server, the holding server and the local device, either locally on those parts or distributed between them. Such an operating program or programs may be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

An embodiment of the present invention may find an application in many areas, such as in remote access situations, security, public appliances, automatic vending and printing.

What is claimed is:

1. A method of employing an information device to transfer one or more data items from a remote holding area to a local device in dependence upon an access identifier representing the location of the one or more data items, comprising:
   encoding the access identifier to an audio/visual representation at the information device,
   presenting the audio/visual representation of the access identifier at the information device,
   capturing the audio/visual representation at the local device,
   determining the location of the one or more data items from the captured audio/visual representation,
   transferring the one or more data items to the local device from the determined location, and
   further comprising encrypting a data item before it leaves the holding area, and decrypting the data item after receipt at the local device, wherein the access identifier comprises decryption information necessary to perform decryption of the data item.

2. A method as claimed in claim 1, wherein the audio/visual representation comprises a graphical representation.

3. A method as claimed in claim 2, wherein the step of presenting the audio/visual representation at the information device comprises displaying the graphical representation on a display of the device.

4. A method as claimed in claim 2, wherein the graphical representation is visible to a human eye.

5. A method as claimed in claim 2, wherein the graphical representation comprises colour.

6. A method as claimed in claim 2, wherein the graphical representation comprises a bar code representation.

7. A method as claimed in claim 6, wherein the graphical representation comprises a two-dimensional bar code representation.

8. A method as claimed in claim 7, wherein the two-dimensional bar code representation is the Quick Response Code representation.

9. A method as claimed in claim 7, wherein the two-dimensional bar code representation is the hueCode representation.

10. A method as claimed in claim 6, wherein the step of capturing the audio/visual representation at the local device comprises scanning the bar code representation with a bar code scanner.

11. A method as claimed in claim 2, wherein the audio/visual representation comprises a textual representation.

12. A method as claimed in claim 11, wherein the step of determining the location comprises decoding the textual representation using an optical character recognition algorithm.

13. A method as claimed in claim 2, wherein the audio/visual representation comprises a sequence of graphical representations.

14. A method as claimed in claim 13, wherein the graphical representations in the sequence are presented at predetermined intervals.

15. A method as claimed in claim 13, wherein the interval between consecutive graphical representations in the sequence is varied throughout the sequence to encode further information regarding the access identifier.

16. A method as claimed in claim 13, wherein each graphical representation in the sequence is a uniform colour.

17. A method as claimed in claim 1, wherein the audio/visual representation comprises an audio sequence.

18. A method as claimed in claim 17, wherein the audio sequence comprises a sequence of tones, chords, pulses or clicks.

19. A method as claimed in claim 1, wherein at least two of the steps of capturing, determining and transferring are performed by separate devices in communication with each other and which separate devices together form the local device.

20. A method as claimed in claim 1, wherein the holding area is located on a remote server.

21. A method as claimed in claim 1, wherein the one or more data items are initially stored in a protected area of a remote server, and the remote holding area is located outside the protected area of the remote server, comprising:
   forming a trusted connection between the information device and the protected area of the remote server;
   employing the information device and the trusted connection to select a first group of one or more data items stored in the protected area of the remote server;
   transferring the first group of data items from the protected area to the holding area and associating the access identifier with the first group of data items;
   forming a retrieval connection between the local device and the holding area in dependence upon the access identifier;
   determining a second group of one or more data items from the first group of data items transferred to the holding area; and
   transferring the second group of data items from the holding area to the local device over the retrieval connection.

22. A method as claimed in claim 1, wherein the access identifier comprises a location identifier representing the location of the holding area.

23. A method as claimed in claim 22, wherein the location identifier itself contains sufficient information to identify the location of the holding area.

24. A method as claimed in claim 22, further comprising looking up the location of the holding area in dependence upon the location identifier.

25. A method as claimed in claim 1, wherein the access identifier comprises a group identifier identifying the one or more data items in the holding area without identifying the location of the holding server.

26. A method as claimed in claim 25, wherein the one or more data items are initially stored in a protected area of a remote server, and the remote holding area is located outside the protected area of the remote server, comprising:
   forming a trusted connection between the information device and the protected area of the remote server;

employing the information device and the trusted connection to select a first group of one or more data items stored in the protected area of the remote server;

transferring the first group of data items from the protected area to the holding area and associating the access identifier with the first group of data items;

forming a retrieval connection between the local device and the holding area in dependence upon the access identifier;

determining a second group of one or more data items from the first group of data items transferred to the holding area, wherein the second group of data items is determined in dependence upon the group identifier identifying the first group of data items transferred to the holding area; and transferring the second group of data items from the holding area to the local device over the retrieval connection.

27. A method as claimed in claim 26, wherein the second group of data items is determined to be the same as the first group of data items.

28. A method as claimed in claim 1, wherein the local device uses generic Internet browsing capabilities to access data items in the holding area.

29. A method as claimed in claim 1, further comprising processing a data item before transferring it to the local device.

30. A method as claimed in claim 29, wherein the processing that is performed is dependent upon the type of the local device.

31. A method as claimed in claim 29, wherein the processing that is performed is dependent upon the location of the local device.

32. A method as claimed in claim 1, wherein the encryption and decryption uses a symmetric key cryptography algorithm.

33. A method as claimed in claim 1, further comprising revoking the access identifier after a predetermined number of uses.

34. A method as claimed in claim 33, wherein the predetermined number is one.

35. A method as claimed in claim 33, further comprising generating a new access identifier following revocation of the previous one.

36. A method as claimed in claim 1, further comprising revoking the access identifier after a predetermined length of time.

37. A method as claimed in claim 1, further comprising revoking the access identifier after all the data items associated with the access identifier have been retrieved from the holding area.

38. A method as claimed in claim 1, further comprising deleting a data item from the holding area after it has been retrieved a predetermined number of times.

39. A method as claimed in claim 38, wherein the predetermined number of times is one.

40. A method as claimed in claim 1, wherein one or more data items associated with the access identifier is/are deleted if the access identifier is revoked.

41. A method as claimed in claim 1, wherein the local device comprises an output device.

42. A method as claimed in claim 41, wherein the local device comprises a printer, and further comprising printing part or all of at least one of the data items transferred to the local device on the printer.

43. A method as claimed in claim 41, wherein the local device comprises a display, and further comprising displaying part or all of at least one of the data items transferred to the local device on the display.

44. A method as claimed in claim 1, wherein at least one of said data items is an email item.

45. A method as claimed in claim 1, wherein at least one of said data items is a document.

46. A method as claimed in claim 44, wherein the local device comprises a printer, and further comprising printing the email item on the printer.

47. A method as claimed in claim 1, wherein the information device is a mobile information device.

48. A method as claimed in claim 47, wherein the information device is a Personal Digital Assistant.

49. A method as claimed in claim 47, wherein the information device is a mobile phone.

50. A method as claimed claim 49, further comprising authenticating the information device by requesting the Subscriber Identity Module number or other operator identifier from the information device.

51. A method as claimed in claim 47, wherein the information device is a laptop computer.

52. A method as claimed in claim 1, wherein the information device is a Digital Television.

53. A method as claimed in claim 1, wherein the information device is a Personal Computer.

54. A method as claimed in claim 1, wherein the local device is a mobile information device.

55. A method as claimed in claim 1, wherein the local device is a public appliance accessible by the general public.

56. A method as claimed in claim 1, wherein the access identifier comprises a Uniform Resource Locator.

57. A method as claimed in claim 1, wherein the information device is in proximity to the local device.

58. A method as claimed in claim 1, further comprising transferring one or more data items received at the local device to a separate device.

59. A method as claimed in claim 58, wherein the separate device is the information device.

60. A method as claimed in claim 58, wherein the local device is used an access point for high-speed retrieval of data items to the separate device.

61. A method as claimed in claim 1, further comprising authenticating the information device before transferring the one or more data items.

62. A method as claimed in claim 61, wherein the access identifier comprises authentication information necessary to perform authentication of the information device.

63. A remote retrieval system comprising:

a remote holding area for storing data items;

a local device in communication with the remote holding area; and an information device comprising encoding means for encoding an access identifier to an audio/visual representation, audio/visual presentation means for presenting the audio/visual representation of the access identifier representing the location of one or more data items to be transferred from the remote holding area to the local device;

wherein the local device comprises audio/visual capturing means for capturing the audio/visual representation presented at the information device, location determining means for determining the location of the one or more data items from the captured audio/visual representation, and transferral means for transferring the one or more data items to the local device from the determined location; and wherein a data item is encrypted before leaving the remote holding area and is decrypted after receipt at the local device, and the access identifier comprises decryption information necessary to perform the decryption of the data item.

64. A method of employing an information device to transfer one or more data items from a local device to a remote holding area in dependence upon an access identifier representing the destination location of the one or more data items, comprising:

encoding the access identifier to an audio/visual representation at the information device, presenting the audio/visual representation of the access identifier at the information device, capturing the audio/visual representation at the local device, determining the destination location of the one or more data items from the captured audio/visual representation, transferring the one or more data items to the determined location in the remote holding area, and further comprising encrypting a data item before transferring to the holding area, and decrypting the data item after receipt at a local device, wherein the access identifier comprises decryption information necessary to perform decryption of the data item.

65. A method as claimed in claim 64, wherein the local device comprises an input device.

66. A method as claimed in claim 65, wherein the local device comprises a scanner.

67. A method as claimed in claim 65, wherein the local device comprises a photocopier.

68. A remote transferral system comprising:

a remote holding area for storing data items;

a local device in communication with the remote holding area; and an information device comprising encoding means for encoding an access identifier to an audio/visual representation, audio/visual presentation means for presenting the audio/visual representation of the access identifier representing the destination location of one or more data items to be transferred from the local device to the remote holding area;

wherein the local device comprises audio/visual capturing means for capturing the audio/visual representation presented at the information device, location determining means for determining the destination location of the one or more data items from the captured audio/visual representation, and transferral means for transferring the one or more data items to the determined location of remote holding area, and wherein a data item is encrypted before transferring to the holding area, and the data item is decrypted after receipt at a local device, and the access identifier comprises decryption information necessary to perform the decryption of the data item.

* * * * *

UNITED STATES PATENT AND TRADEMARK OFFICE
CERTIFICATE OF CORRECTION

PATENT NO. : 7,624,916 B2
APPLICATION NO. : 10/995621
DATED : December 1, 2009
INVENTOR(S) : Sato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Twenty-sixth Day of October, 2010

David J. Kappos
*Director of the United States Patent and Trademark Office*